(12) United States Patent
Ford et al.

(10) Patent No.: US 7,414,088 B1
(45) Date of Patent: Aug. 19, 2008

(54) POLYMERS GRAFTED TO CARBON NANOTUBES

(75) Inventors: Warren Thomas Ford, Stillwater, OK (US); Shuhui Qin, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 495 days.

(21) Appl. No.: 10/934,790

(22) Filed: Sep. 3, 2004

Related U.S. Application Data

(60) Provisional application No. 60/500,872, filed on Sep. 5, 2003.

(51) Int. Cl.
C08K 3/04 (2006.01)
C08K 3/00 (2006.01)
C08F 26/08 (2006.01)

(52) U.S. Cl. ........................ 524/495; 524/496; 524/847; 526/264

(58) Field of Classification Search ................. 524/495, 524/496, 847; 526/264
See application file for complete search history.

(56) References Cited

U.S. PATENT DOCUMENTS

| 2002/0068170 A1 | 6/2002 | Smalley et al. ............... 428/403 |
| 2003/0083421 A1 | 5/2003 | Kumar et al. ............... 524/496 |
| 2003/0089893 A1* | 5/2003 | Niu et al. ..................... 252/500 |

FOREIGN PATENT DOCUMENTS

| WO | WO 03/038837 A1 | 5/2003 |
| WO | WO03038837 A1 * | 5/2003 |
| WO | WO 03038837 A1 * | 5/2003 |
| WO | WO 03/078317 A1 | 9/2003 |
| WO | WO 04/001107 A2 | 12/2003 |
| WO | WO 04001107 A2 * | 12/2003 |

* cited by examiner

*Primary Examiner*—Randy Gulakowski
*Assistant Examiner*—Michael M Bernshteyn
(74) *Attorney, Agent, or Firm*—Fellers, Snider, Blankenship, Bailey & Tippens

(57) ABSTRACT

A method comprising forming and grafting polymers on carbon nanotubes, a functionalized product and product dispersion produced by the method, a method of forming composites from the functionalized carbon nanotubes, and the composites produced therefrom.

2 Claims, 2 Drawing Sheets

POLYMERS GRAFTED TO CARBON NANOTUBES

This application claims the benefit of U.S. Provisional Patent Application Ser. No. 60/500,872 filed on Sep. 5, 2003.

STATEMENT REGARDING FEDERALLY SPONSORED RESEARCH

The Government of the United States of America has certain rights in this invention pursuant to Grant No. EPS-0132534 awarded by the National Science Foundation.

BACKGROUND OF THE INVENTION

1. Field of the Invention

The present invention relates to: a method of forming and grafting polymers on carbon nanotubes and the functionalized products produced therefrom; a method of forming stable dispersions of carbon nanotubes and the products produced therefrom; and a method of forming composites from functionalized carbon nanotubes and the composite products produced therefrom.

2. Background

Single-walled carbon nanotube (SWNT) and multi-walled carbon nanotube (MWNT) materials (SWNT and MWNT being collectively referred to herein as "CNT") exhibit outstanding physical, chemical and mechanical properties, and have been understood to have enormous potential for materials applications. For example, it has been expected that CNT materials should be useful in many different fields including field emission displays, supercapacitors, molecular computers, and ultrahigh strength materials. However, most such applications employing the unique electronic, thermal, optical, and mechanical properties of CNT require that the CNT material be in individual (unbundled) form and in high purity. Unfortunately, as-prepared CNT products contain significant impurities, many of which consist of or include metal catalyst particles and amorphous carbon. Moreover, the individual nanotube elements of the CNT products pack together to form bundles that aggregate into tangled, essentially unusable, networks due to strong van der Waals attraction.

To date, a number of purification methods have been attempted. They can be categorized as acid oxidation, gas oxidation, filtration, chromatography, microwave treatment, and organic functionalization. By using these methods, most of the metal catalyst particles and the amorphous carbon in raw CNT materials can be removed; leaving rather purified CNT in different yields. The disadvantages of these purification methods are that multiple treatment steps are needed and/or only a small quantity (e.g., about 5 mg) of CNT is purified each time. Furthermore, as seen by transmission electron microscopy (TEM) imaging, the purified CNT product is still in the form of big bundles which will not dissolve in any current solvents.

Although some progress has been made toward the solubilization of CNT in both organic and aqueous media, the results have thus far been inadequate. Dissolution in organic solvents has been reported with bare CNT fragments and with chemically modified CNT. Dissolution in water, which is more important because of potential biomedical applications and biophysical processing schemes, has been facilitated by surfactants and polymers, by polymer wrapping, and by chemical modification. In most of these studies, however, the extent to which the suspended materials exist as individual tubes or small bundles of tubes has not been reported. Furthermore, tube aggregation in solution has not been well quantified.

SUMMARY OF THE INVENTION

In the present invention, there is provided a method for producing polymer/nanotube composites in which the polymers are chemically bonded to the nanotubes. The method is effective and convenient for functionalization, solubilization, and purification of carbon nanotube materials. The composites are dispersible in water or other solvents or liquid media to form stable solutions or colloidal dispersions which do not separate for extended periods of time ranging from hours to months. The solutions and colloidal dispersions can be used to cast solid films of the polymers in which the nanotubes provide increased electrical conductivity, thermal conductivity, and mechanical strength. The polymer functionalized nanotubes also can be dispersed into the parent polymer and melt processed to improve electrical conductivity, thermal conductivity, and mechanical strength.

By way of example, but not by way of limitation, the method is applicable to most polymers that are producible by free-radical chain reactions. Examples include, but are not limited to, polymers formed from acrylates, methacrylates, acrylamides, vinylamides, vinylesters, vinylhalides, and vinylaromatics. The process is applicable to generally any raw, pristine, oxidized, or other CNT material. In one aspect, the inventive process comprises the dispersion of CNT in water or organic solvent with monomer and initiator, preferably by shaking, stirring, or other agitation, and with heating to initiate polymerization. The resulting functionalized CNT product materials are inventive compositions of matter which are useful, for example, to construct layer-by-layer thin films of polyelectrolytes suitable for use: in high strength films and coatings; in dissipating static charges; in photovoltaic devices; in electrical contacts with semiconductors; or with biological materials.

The inventive process requires no pretreatment of the CNT material and works well with the CNT products as-received from manufacturers. Both the debundling and functionalization of CNT material can be achieved in one step, thus allowing the use of a one-pot reaction process. As used herein, the term "one-pot reaction" means that preliminary dispersion of nanotubes, grafting of polymers to nanotubes, and removal of impurities can all be performed in one container. The functionalized CNT product material homogenously disperses in water or other liquid media as individual tubes and/or small bundles as characterized by various spectroscopies.

In one aspect, there is provided a method comprising the step of reacting a monomer material in the presence of a carbon nanotube (CNT) material such that a polymer product is produced from the monomer material and is chemically bonded to the CNT material to form a functionalized carbon nanotube product. As used herein and in the claims, the term "functionalized" means that chemical bonds are formed between the polymer chains and the nanotubes. The step of reacting is preferably conducted in liquid media. The liquid medium is preferably a solvent capable of dissolving the polymer. The solvent can be water or an organic liquid, depending on the polymer.

In another aspect, there is provided a method comprising the step of reacting a monomer material in the presence of a CNT material such that a charged polyelectrolyte product is produced from the monomer material and is chemically bonded to the CNT material to form a functionalized carbon nanotube product. The polyelectrolyte can have either a negative or a positive charge. This method preferably further comprises the step of assembling the polyelectrolyte-functionalized carbon nanotube product with a polyelectrolyte material of opposite charge using a layer-by-layer technique to produce a composite product.

Further aspects, features, and advantages of the present invention will be apparent to those in the art upon examining the accompanying drawings and upon reading the following detailed description of the preferred embodiments.

DETAILED DESCRIPTION OF THE PREFERRED EMBODIMENTS

Figures 1, 2:
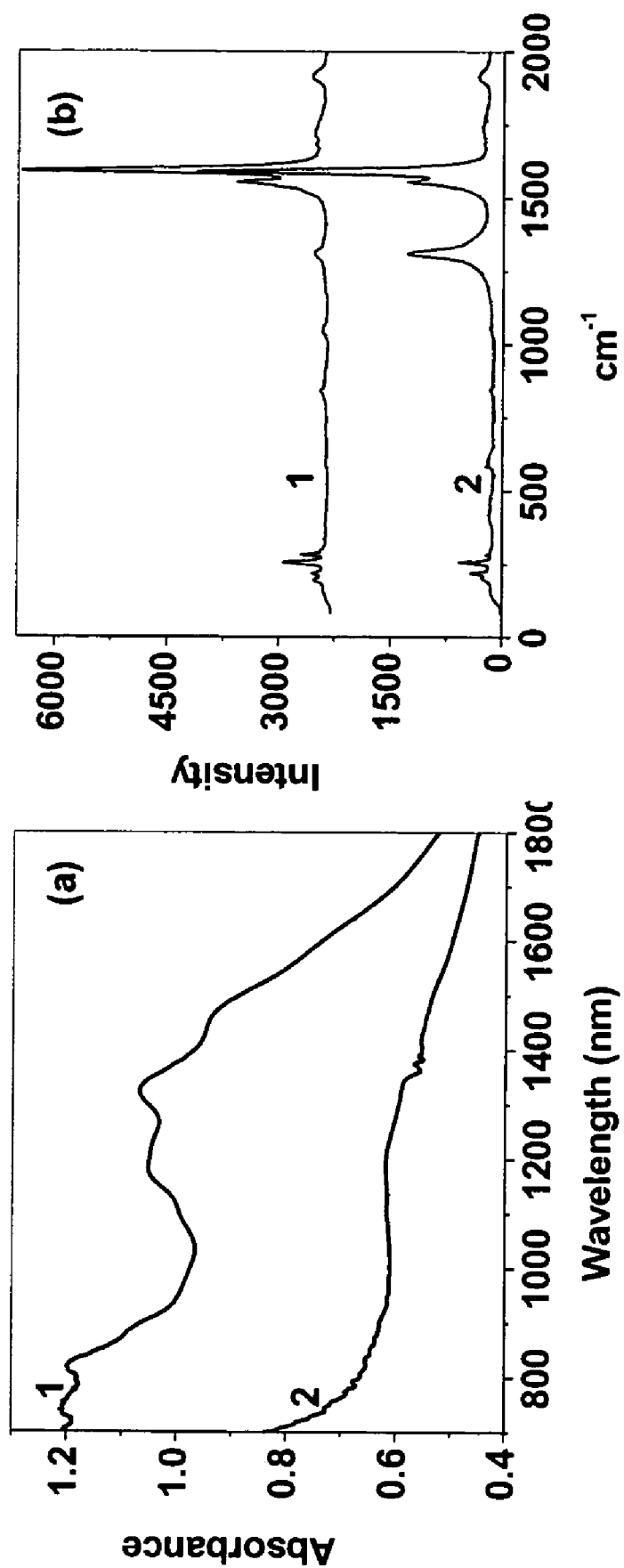
FIG. 1 shows: Near-IR spectra of (1) pristine, unfunctionalized HiPco™ SWNT material and (2) functionalized SWNT.
FIG. 2 shows Raman spectra of (1) pristine, unfunctionalized HiPco™ SWNT material and (2) functionalized SWNT material.

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

In the present invention, at least one monomer material and at least one carbon nanotube (CNT) material are preferably dispersed in a liquid medium and a polymerization reaction is conducted such that a polymer product is produced from the monomer material and is chemically bonded to the CNT material to form a functionalized carbon nanotube product. To assist in initiating and promoting the polymerization reaction, at least one initiator material will preferably also be added to and dispersed in the liquid medium and the reaction system will preferably be heated and agitated by stirring, shaking, or other suitable procedures.

The carbon nanotube (CNT) material used in the present invention can be any single-walled or multi-walled carbon nanotube material. As will be understood by those in the art, such materials are typically produced, for example, by arc discharge of a carbon electrode, laser vaporization of carbon material, or vapor phase reaction of carbon compounds in the presence of an appropriate metal catalyst, generally comprising iron or cobalt. Examples of commercially available CNT materials suitable for use in the present invention include: HiPco™, available from Carbon Nanotechnologies, Inc. of Houston, Tex.; SWeNT, available from Southwest Nanotechnologies of Norman, Okla.; Carbolex, available from Carbolex, Inc., of Lexington, Ky.; and many others.

Examples of liquid media suitable for use in the present invention include, but are not limited to, water, N,N-dimethylformamide, N,N-dimethylacetamide, N-methylpyrrolidinone, acetone, butanone, acetonitrile, and low molecular weight alcohols. The liquid medium employed in polymerizing the polyelectrolytes of the present invention will preferably be water.

The monomer material employed in the polymerization reaction can generally be any material capable of forming polymer chains or other structures which will chemically bond to the outer wall of the CNT material and are soluble in the liquid medium. The polymer product formed from the monomer material will preferably be water-soluble. Examples of preferred water soluble polymer products produced in the polymerization step include, but are not limited to, polyacrylic acid, polymethacrylic acid, polyacrylamides, polyvinylamides, polymethacrylamides, polyvinylesters, polyvinylhalides, polyvinylaromatics, poly(sodium 4-styrenesulfonate), polyvinylpyrrolidone, poly(4-vinylpyridine), poly(vinylbenzyltrimethyl-ammonium chloride), or copolymers thereof. The polymer will preferably be poly(sodium 4-styrenesulfonate), poly(acrylic acid), poly(vinylbenzyltrimethylammonium chloride), or poly(4-vinylpyridine) and will most preferably be poly(sodium 4-styrenesulfonate). The amount of monomer material included in the reaction system will preferably be an excess with respect to the amount of nanotube material.

The polymerization initiator employed in the reaction step of the inventive method can generally be any material effective for generating free radicals in solution. In the case of water soluble polymers, examples of suitable initiator materials include, but are not limited to, potassium persulfate, ammonium persulfate, and ionic azo compounds such as those sold under the trade name VAZO by Wako Chemical Co., and combinations of persulfate compounds and oxidizing or reducing agents. In the case of organic soluble polymers, examples include, but are not limited to, peroxides such as dibenzoyl peroxide and azo compounds such as azobisisobutyronitrile. The amount of initiator added to the reaction system will preferably be an amount effective for consumption of most or all of the monomer.

In conducting the polymerization reaction step, it will generally be beneficial to heat the liquid medium and the other components of the reaction system to a temperature effective for initiating and promoting the polymerization reaction. The reaction system will typically be heated to at least 30° C. and will more preferably be heated to a temperature in the range of from about 60° C. to about 130° C. depending on the temperature needed to generate radicals from the initiator.

Figure 3:
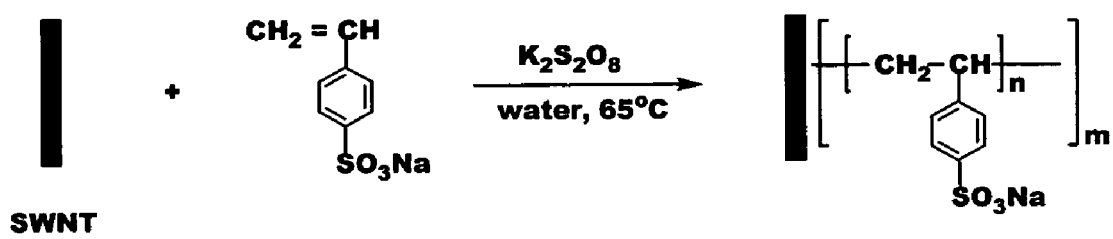
FIG. 3 illustrates the functionalization of SWNT with styrenesulfonate.

By way of example, FIG. 3 illustrates the polymerization of styrenesulfonate in the presence of SWNT using a $K_2S_2O_8$ initiator in water at 65° C. to produce a functionalized SWNT product. In this illustration, "n" is an integer in the range of from about 5 to about 5000 and "m" is an integer in the range of from about 2 to about 100. The weight of styrenesulfonate monomer material added to this reaction system will preferably be in the range of from about 10 to about 1000 parts by weight per each part by weight of SWNT material.

In the reaction step of the inventive process, it is believed that the tightly bound bundles of the raw CNT material capture the propagating polymer macro radicals such that lengthy chains of soluble polymer product are chemically bonded to the outer layer of tubes. Because of the attachment and growth of these polymer chains and the agitation of the reaction system, the strong van der Waals forces holding the outer functionalized nanotubes are overcome such that these functionalized nanotubes break free from the bundles and disperse in the liquid reaction media. This process preferably then continues with each succeeding layer of nanotubes until all of the nanotubes are dispersed as either very small bundles or individual tubes in the liquid medium.

The polymerization step of the inventive process preferably produces a dispersion of the functionalized CNT product material in the liquid medium. The dispersion product is preferably purified in order to remove catalyst and catalyst by-product materials contained in the raw CNT material and to remove unattached polymer products and by-products and other impurities.

In a preferred purification procedure, the functionalized CNT product dispersion is centrifuged in order to remove catalyst particles, catalyst particle by-products, less functionalized CNT bundles, amorphous carbon materials, and/or other impurities. The dispersion is preferably also filtered in order to remove unattached polymer products. Examples of filter materials and elements suitable for use in the filtration procedure include, but are not limited to, micropore filter membranes sold by Millipore Corp. and other polymeric membranes with pore sizes generally less than 0.5 μm sold by many companies.

In another aspect of the invention, the functionalized CNT product material is assembled with one or more oppositely charged polymer materials to form a functional membrane using, for example, a layer-by-layer technique. In one preferred embodiment, the CNT material is functionalized with a negatively charged polyelectrolyte such as poly(sodium 4-styrenesulfonate) and is assembled with a polycation such as poly(ethylenemine), poly(diallyldimethylammonium chloride), and/or other polycations having positively charged functions. The layer-by-layer procedure for forming the functional membrane will preferably include the steps of dipping a substrate alternately into the functionalized CNT dispersion and an oppositely charged polymer solution with water washing after each application to remove any excess of the polymer.

Examples of suitable substrates include, but are not limited to, glass, silicon wafers, water-insoluble polymers, metals, metal-coated surfaces, and water-insoluble organic crystals. Such films can be used for applications such as biological and chemical sensors, optical storage, light emitting diodes, separation membranes, and mechanical reinforcements. The layer-by-layer films can be made, for example, from polyelectrolytes, metal or semiconductor colloidal particles, biological polymers, and other materials that form by alternating deposition of cations and anions, or acids and bases, or hydrogen bond donors and acceptors.

The present invention is further illustrated by the following example, which is intended to aid understanding of the invention but is not intended to, and should not be construed to, limit in any way the invention as set forth in the claims which follow thereafter.

EXAMPLE

A 100 mL dried Schlenk flask was charged with a properly sized magnetic stirrer, 4.0 g of sodium 4-styrenesulfonate (NaSS), 40 mg of as-received HiPco™ SWNT, and 60 mL of deionized (DI) water. After stirring for 10 hr at room temperature, 40 mg of $K_2S_2O_8$ were added and the reaction mixture was degassed by four freeze-pump-thaw cycles. The flask was then placed in a thermostated oil bath at 65° C. under stirring to start polymerization to produce poly(sodium 4-styrenesulfonate) (PSS). After 48 hr the reaction was stopped by cooling to room temperature and the flask was opened to air.

Next, the reaction product mixture was diluted to 500 mL with deionized (DI) water, bath sonicated for 1 hr, and centrifuged at around 6,000 g for 8 hr. After removal of the homogenous black supernatant, a black sediment (mainly iron catalyst) was redispersed in water by stirring and centrifuged at around 6,000 g for 4 hr and the supernatant was collected. The procedure was performed three times. All supernatants were added together and vacuum filtered through a 0.2 μm PTFE membrane to remove unattached polymer. After washing ten times with DI water, the black solid was re-dissolved in 300 mL DI water with stirring to form a black solution. The solution was then centrifuged at 220,000 g for 8 hr. After removal of supernatant (mainly amorphous carbon and residual free PSS), the precipitate was re-dissolved in DI water and centrifuged for another 8 hr. The procedures were repeated three times. Part of the final black precipitate for elemental analysis was vacuum dried 48 hr at 100° C., and the rest was kept in 100 mL DI water.

The near-IR absorption spectrum of the functionalized SWNT (FIG. 1, curve 2) displayed a loss of features compared to the pristine SWNT spectrum (FIG. 1, curve 1), indicating a disruption in the electronic structure of the nanotubes. The Raman spectrum of the functionalized SWNT (FIG. 2, curve 2) was also considerably altered compared to the spectrum of pristine SWNT (FIG. 2, curve 1), in which the radial breathing (180~260 $cm^{-1}$) and tangential (1590 $cm^{-1}$) modes characteristic of pristine SWNT were still present, but the disorder (1315 $cm^{-1}$) mode was obviously enhanced. Both the loss of structure in the near-IR spectrum and the increased disorder mode in the Raman spectrum indicated that the PSS was attached by covalent bonding to the sidewalls of SWNT, not simply by wrapping. Smalley et al., *Chemical Physics Letters*, Volume 342, pages 265-271 (2001), report that surfactant, poly(vinylpyrrolidone), and PSS wrapped SWNT exhibit well-defined structure in absorption spectra and the near absence of the disorder peak in the Raman spectra. In a comparable experiment by stirring a pristine SWNT and pre-prepared PSS polymer mixture using the same conditions as the functionalization experiment, the SWNT precipitated onto the bottom of the flask without any centrifugation after reaction and did not disperse in the reaction mixture after 1 hr sonication.

TEM images of the functionalized SWNT showed single tubes with a diameter below 4 nm. Although the diameter distributions of the individual raw HiPco™ SWNT material ranged from 0.6 nm to 1.3 nm, the attached PSS chains thickened the SWNT diameter and exhibited roughened sidewalls. The TEM images of the as received SWNT material showed a network of bundles having diameters of 30 to 100 nm, along with many iron particles. The observation demonstrated that the attachment of PSS leads to disruption of the inter-tube interactions in the bundles during functionalization. It is believed that the propagating PSS macro radicals were captured by the SWNT bundles and that the attached long, water soluble PSS chains, and stirring, helped the outermost SWNT bundle layers overcome the strong van der Waals attraction and dissolve in water.

After purification by filtration and centrifugation, the solution of functionalized SWNT in water was stable for more than 18 months. In contrast, without polymer attachment, the SWNT precipitated in 5 minutes. Elemental analysis results showed that the weight percent of PSS fraction in SWNT/PSS composite was 48%, indicating that only a very small amount of PSS macro radicals were captured by SWNT and most of the PSS macro radicals were terminated by coupling or proportionation reaction.

Information about the distribution of, diameter, and length of the functionalized SWNT material was derived directly by tapping mode AFM. From the large-scale AFM image (10×10 $μm^2$ in scale), the functionalized SWNT material was shown to be rather pure and well dispersed without large bundles. The contour lengths of the functionalized SWNT material ranged from several hundred nanometers to several micrometers, and the average diameter, determined by the contour height, was 1.3 nm. The 1.3 nm diameter indicated a separate single tube, though it is larger than the diameter of HiPco™ (0.6~1.3 nm) due to the PSS appended to the sidewalls of the SWNT material.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method comprising the step of reacting a monomer material in the presence of a carbon nanotube material such that a polymer product is produced from said monomer material and is chemically bonded to said carbon nanotube material to form a functionalized carbon nanotube product, wherein:

said polymer product is a polyelectrolyte having a charge;

said method further comprises the step of assembling said functionalized carbon nanotube product with a polyelectrolyte material of opposite charge using a layer-by-layer technique to produce a composite product;

said polymer product is poly(sodium 4-styrenesulfonate); and said polyelectrolyte material of opposite charge is polyethyleneimine or poly(diallyldimethylammonium chloride).

2. A composite product produced by the method of claim 1.

* * * * *